Patented Apr. 15, 1952

2,593,248

UNITED STATES PATENT OFFICE 2,593,248

ANDROSTATRIENES AND METHOD OF PREPARING THE SAME

Seymour Bernstein and Karl J. Sax, Pearl River, N. Y., assignors to American Cyanamid Company, New York, N. Y., a corporation of Maine No Drawing. Application October 27, 1950, Serial No. 192,629

14 Claims. (Cl. 260—397.4)

This invention relates to new chemical compounds of the cyclopentanodimethylpolyhydrophenanthrene series and to the processes for preparing the same.

Recently great interest has been shown in some of the compounds of this series, particularly those having the side chain in the 17-position and keto groups in the 3 and 11-positions. One of these compounds which occurs naturally in the adrenal cortex and which is commonly referred to as cortisone has been found to be highly active in the treatment of arthritis, rheumatic fever and related pathological conditions. The compound cortisone has been described chemically as $\Delta^4$-pregnene-17$\alpha$,21-diol-3,11,20-trione. Compounds having a chemical structure related to cortisone have also been reported as having cortisone-like activity.

We have found that certain substituted cyclopentanodimethylpolyhydrophenanthrenes having double bonds in the 5-6, 7-8 and 9-11 positions may be useful in preparing physiologically active compounds. The compounds of the present invention can be prepared by the following general reaction:

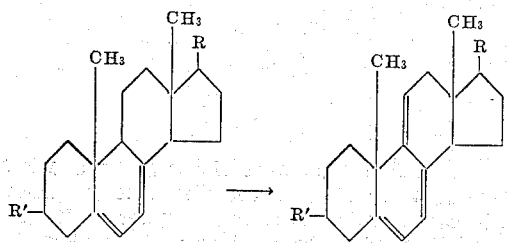

in which R is a member of the group consisting of oxygen, hydroxy, acyloxy and aroyloxy radicals and R' is a member of the group consisting of hydroxy, acyloxy and aroyloxy radicals.

These compounds are generally crystalline solids with relatively high melting points and are usually soluble in the common organic solvents. They can be purified by recrystallization from lower aliphatic alcohols.

The compounds of the present invention can be prepared by heating a 3,17-disubstituted$\Delta^{5,7}$-androstadiene with mercuric acetate and acetic acid in the presence of a lower aliphatic alcohol. The 3,17-disubstituted$\Delta^{5,7}$-androstadienes are dissolved in a lower aliphatic alcohol and the mercuric acetate in solution along with the glacial acetic acid is added thereto. The mixture is heated at reflux temperature in order to complete the reaction and the product recovered therefrom.

In some cases the 3,17-disubstituted$\Delta^{5,7}$-androstadienes used as starting materials in the present invention may be new compounds. A representative method of preparing these compounds is described in the examples hereinafter. In the general equation given above R can be an acyloxy radical such as acetoxy, propionyloxy, butyryloxy or similar acyloxy radical. The aroyloxy group can be a radical such as benzoyloxy, naphthoyloxy and the like. Similarly R' can be an acyloxy or aroyloxy of the type described immediately above.

In carrying out the process of the present invention we prefer to heat the reaction mixture at a temperature of from about 50° C. to about 125° C. At this temperature the reaction is usually completed within a period of 10 minutes to about 2 hours.

After the reaction is complete the product may be recovered by filtering off the mercurous acetate, adding water, and working up the product in a water immiscible organic solvent, such as carbon tetrachloride. The organic solvent is washed with dilute acetic acid and water, dried, and filtered. Evaporation of the solvent under reduced pressure gives the crude product which is recrystallized from a lower aliphatic alcohol, giving a solid crystalline product having a definite melting point.

The process of the present invention is preferably carried out using an ester group in the 3-position. When the sterol itself is desired it can be obtained by hydrolyzing the ester groups in the 3 and/or 17-positions with a solution of an alkali such as alkali metal hydroxide or carbonate.

The compounds of the present invention are useful in the field of pharmaceuticals and may serve as intermediates in the preparation of compounds having cortisone-like activity. The invention will now be described in greater detail in the following examples wherein representative compounds within the scope of the general reaction are prepared.

Example 1

To a solution of 3.48 g. of $\Delta^5$-androstene-3$\beta$,17$\beta$-diol diacetate in 50 ml. of carbon tetrachloride was added 75 ml. of petroleum ether and a 1.99 g. of N-bromosuccinimide. The mixture was refluxed and irradiated by the heat and light of one photospot lamp for 5 minutes. To the still refluxing mixture was added 7.5 ml. of 2,4,6-collidine. The mixture was cooled and the solid separated by filtration. The filtrate was evaporated under reduced pressure and the residue was treated with 100 ml. of xylene. The mixture was refluxed in a nitrogen atmosphere for 15 minutes, cooled and filtered. The filtrate was evaporated under reduced pressure in a nitrogen atmosphere and gave an oily residue which was dissolved in methanol and precipitated water. This gave oily crystals which on recrystallization successively from dilute methanol, methanol and dilute methanol gave $\Delta^{5,7}$-androstadiene-$3\beta,17\beta$-diol diacetate having a melting point of about 133.5° C.

Sixteen grams of mercuric acetate was dissolved in 4 ml. of acetic acid and 125 ml. of ethanol and was added to a refluxing solution of 5.5 g. of $\Delta^{5,7}$-androstadiene-$3\beta,17\beta$-diol diacetate in 30 ml. of ethanol. The reaction mixture was refluxed for 1 hour and 10 minutes. The mixture was filtered hot and water was added to the filtrate, and the product was worked up in carbon tetrachloride. The extract was washed with dilute acetic acid and water until neutral, dried with magnesium sulfate, treated with activated charcoal and filtered through diatomaceous earth. The solution was evaporated under reduced pressure. The oily residue was heated with methanol, cooled and worked with a glass rod. No crystallization occurred. An aliquot portion was examined in the ultraviolet light which indicated that no starting material was present.

One-half of the weight of the oil was dissolved in 5% methanolic potassium hydroxide and was refluxed for 45 minutes. The solution was added to an ice slurry and the resulting crystals were collected. The product was dissolved in acetone, treated with activated charcoal and filtered through diatomaceous earth. The filtrate was concentrated and added to an ice slurry. The crystals were collected and again dissolved in acetone. The solution was treated with activated charcoal and concentrated. This gave 0.78 g. of $\Delta^{5,7,9}$-androstatriene-$3\beta,17\beta$-diol. Recrystallization from acetone-petroleum-ether gave 0.34 g., melting point, 188°–191° C.

*Example 2*

A hot solution of 4.8 g. of mercuric acetate in ethanol containing 2 ml. of glacial acetic acid was added to a hot solution of 1.64 g. of $\Delta^{5,7}$-androstadiene-$3\beta$-ol-17-one acetate in ethanol (total volume of ethanol for both solutions was 100 ml). The reaction mixture was refluxed on the steam bath in a nitrogen atmosphere for 1.5 hours. It was cooled to room temperature and the mercurous acetate was removed by gravity filtration. The filtrate was added to about 2 volumes of water, and the product was worked up in carbon tetrachloride. The extract was washed twice with dilute acetic acid, and finally with water. The extract was dried with anhydrous magnesium sulfate, treated with activated charcoal and filtrated through diatomaceous earth. The filtrate was evaporated under reduced pressure in a nitrogen atmosphere. This gave a yellow viscous oil which was dissolved in methanol. On being worked at −80° C. the solution gave crystals of $\Delta^{5,7,9}$-androstatriene-$3\beta$-ol-17-one acetate. After recrystallization from methanol, the melting point was 162°–164° C., weight, 0.22 g.;

$$\lambda^{abs.\ alc.}_{max.}\ 323\ m\mu$$

inflection at 311–311.5 m$\mu$.

*Example 3*

One hundred and fifty milligrams of $\Delta^{5,7,9}$-androstatriene-$3\beta$-ol-17-one acetate in 20 ml. of 5% alcoholic potassium hydroxide was refluxed in a nitrogen atmosphere for ½ hour. The mixture was cooled, water was added; the product collected by filtration and was washed with dilute ethanol and water. Recrystallization from dilute methanol, acetone-petroleum ether (boiling point 64°–66° C.) and from dilute acetone gave pure $\Delta^{5,7,9}$-androstatriene-$3\beta$-ol-17-one, melting point 169.2°–170° C.;

$$\lambda^{abs.\ alc.}_{max.}\ 323\ m\mu$$

*Example 4*

One hundred milligrams of $\Delta^{5,7,9}$-androstatriene-$3\beta,17\beta$-diol in 1 ml. of pyridine was treated in the cold with ½ ml. of acetic anhydride. The mixture was allowed to stand at room temperature for 65 hours. The product was worked up in ether, and evaporation gave an oil which was practically pure $\Delta^{5,7,9}$-androstatriene-$3\beta,17\beta$-diol diacetate on the basis of its ultraviolet absorption spectrum.

*Example 5*

One hundred milligrams of $\Delta^{5,7,9}$-androstatriene-$3\beta,17\beta$-diol in 4 ml. of pyridine was treated in the cold with 1.8 ml. of benzoyl chloride, and the mixture was allowed to stand at room temperature for 18 hours. Cold dilute acetic acid was added, and the product was worked up in benzene. Evaporation of the benzene gave an oily residue which crystallized on being worked with methanol. Pure $\Delta^{5,7,9}$-androstatriene-$3\beta,17\beta$-diol dibenzoate was obtained by recrystallization from methanol, melting point 202°–205° C., $[\alpha]_D^{29} +179.7°$ (CHCl$_3$).

We claim:

1. Compounds of the group having the general formula:

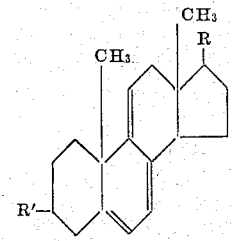

in which R is a member of the group consisting of oxygen, hydroxy, lower alkanoyloxy and benzoyloxy radicals and R' is a member of the group consisting of hydroxy, lower alkanoyloxy and benzoyloxy radicals.

2. Compounds of the group having the general formula:

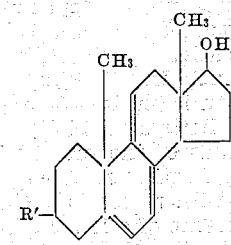

in which R' is a lower alkanoyloxy radical.

3. $\Delta^{5,7,9}$-Androstatriene-$3\beta$-ol-17-one acetate.
4. $\Delta^{5,7,9}$-Androstatriene-$3\beta$-ol-17-one.
5. $\Delta^{5,7,9}$-Androstatriene-$3\beta,17\beta$-diol diacetate.
6. $\Delta^{5,7,9}$-Androstatriene-$3\beta,17\beta$-diol dibenzoate.
7. $\Delta^{5,7,9}$-Androstatriene-$3\beta,17\beta$-diol.

8. A method of preparing compounds having the general formula:

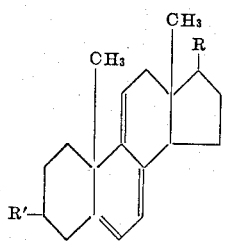

in which R is a member of the group consisting of oxygen, hydroxy, lower alkanoyloxy and benzoyloxy radicals and R' is a member of the group consisting of hydroxy, lower alkanoyloxy and benzoyloxy radicals which comprises heating the corresponding $\Delta^{5,7}$-androstadiene with mercuric acetate and acetic acid in the presence of a lower aliphatic alcohol and recovering said product therefrom.

9. A process of preparing compounds having the general formula:

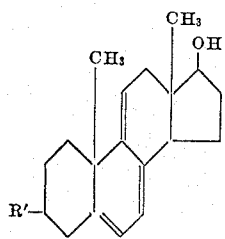

in which R' is a lower alkanoyloxy radical which comprises heating the corresponding $\Delta^{5,7}$-androstadiene with mercuric acetate and acetic acid in the presence of a lower aliphatic alcohol and recovering said compound therefrom.

10. A process of preparing $\Delta^{5,7,9}$-androstatriene-3$\beta$-ol-17-one acetate which comprises heating $\Delta^{5,7}$-androstadiene-3$\beta$-ol-17-one acetate with mercuric acetate and acetic acid in the presence of a lower aliphatic alcohol and recovering said product therefrom.

11. A process of preparing $\Delta^{5,7,9}$-androstatriene-3$\beta$-ol-17-one which comprises heating $\Delta^{5,7}$-androstadiene-3$\beta$-ol-17-one acetate with mercuric acetate and acetic acid in the presence of a lower aliphatic alcohol, subsequently hydrolyzing the resulting product and recovering said compound therefrom.

12. A method of preparing $\Delta^{5,7,9}$-androstatriene-3$\beta$,17$\beta$-diol diacetate which comprises heating $\Delta^{5,7}$-androstadiene-3$\beta$,17$\beta$-diol diacetate with mercuric acetate and acetic acid in the presence of a lower aliphatic alcohol and recovering said compound therefrom.

13. A method of preparing $\Delta^{5,7,9}$-androstatriene-3$\beta$,17$\beta$-diol dibenzoate which comprises heating $\Delta^{5,7}$-androstadiene-3$\beta$,17$\beta$-diol dibenzoate with mercuric acetate and acetic acid in the presence of a lower aliphatic alcohol and recovering said compound therefrom.

14. A method of preparing $\Delta^{5,7,9}$-androstatriene-3$\beta$,17$\beta$-diol which comprises heating $\Delta^{5,7}$-androstadiene-3$\beta$,17$\beta$-diol diacetate with mercuric acetate and acetic acid in the presence of a lower aliphatic alcohol, subsequently hydrolyzing the resulting product and recovering said compound therefrom.

SEYMOUR BERNSTEIN.
KARL J. SAX.

No references cited.